UNITED STATES PATENT OFFICE.

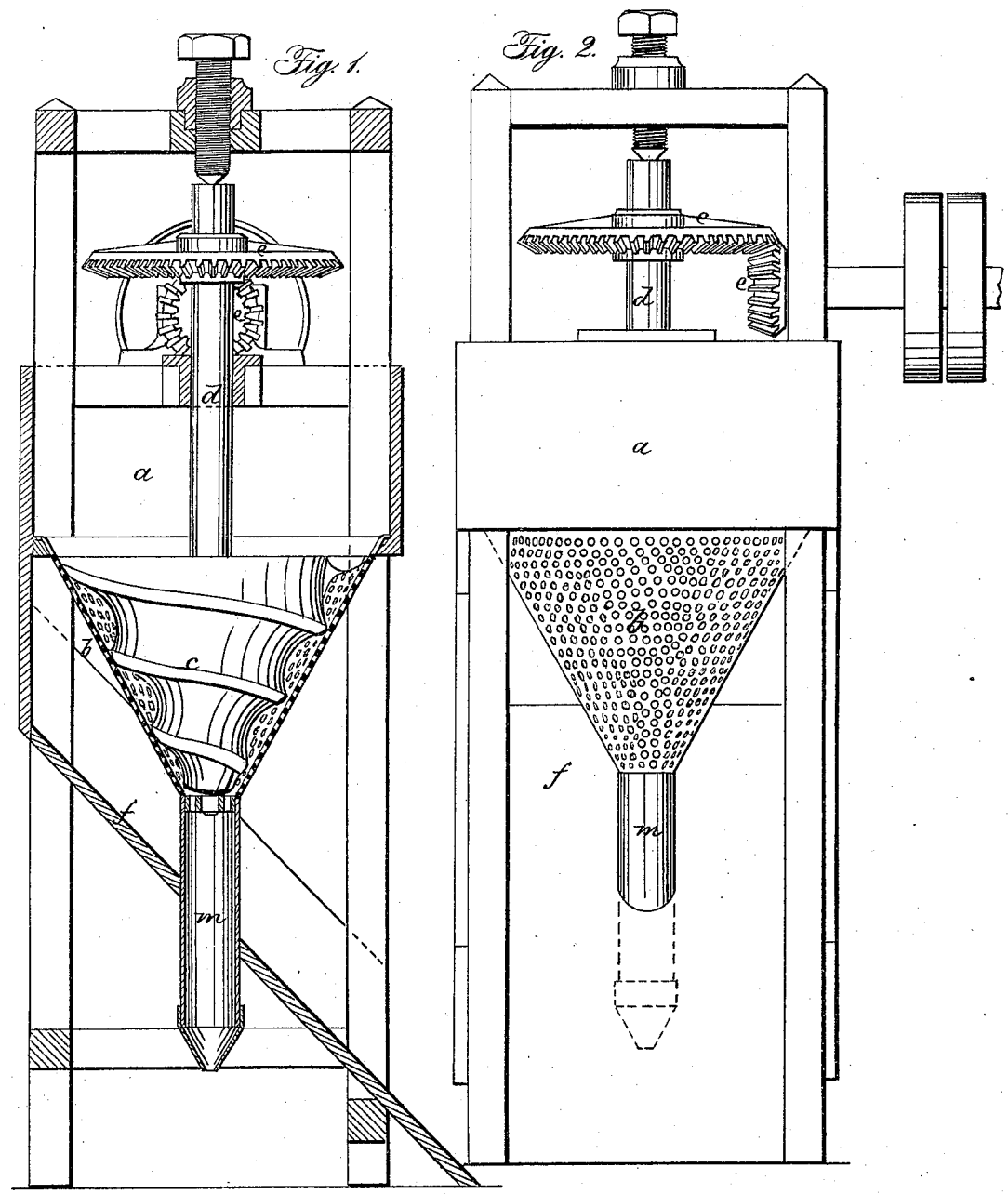

WILLIAM HENRY BUCKLAND, OF COUNTY OF GLAMORGAN, ENGLAND, ASSIGNOR TO EMORY RIDER, OF NEW YORK, N. Y.

IMPROVED MODE OF PREPARING PEAT.

Specification forming part of Letters Patent No. 34,391, dated February 11, 1862.

*To all whom it may concern:*

Be it known that I, WILLIAM HENRY BUCKLAND, ironmaster, of the Maesteg Iron Works, in the county of Glamorgan, England, have invented Improvements in the Preparation of Peat; and I do hereby declare that the following is a full and exact description of the said invention.

The object of this invention of improvements in the preparation of peat is to treat peat so as to prepare a material that will be suitable for conversion into charcoal or for molding into bricks or cakes or other suitable forms to be used as a fuel, or into various forms which may be converted into a variety of articles, both useful and ornamental.

Ordinary peat when taken from the bog a short distance below the surface is generally found to consist of a black pasty unctuous or slimy mass with which is intermingled more or less vegetable fiber, such as fine stringy roots. The black pasty portion of the peat consists of the decomposed vegetable fiber, while the rooty or fibrous portions of the mass consist of undecomposed vegetable fiber. Most of these undecomposed fibers are, in fact, tubes and contain more or less water, which it is difficult to get rid of by any of the ordinary mechanical operations usually employed for the purpose. Various attempts have been made from time to time to prepare peat in such a manner as will admit of its being used for fuel and other useful purposes for which it may be applicable, and the plan usually adopted to effect this object has been to consolidate the mass by pressure so as to express a certain portion of the water and cause it to be molded into blocks of convenient size and shape. It has also been proposed to incorporate with the peat other materials—such as small coal, tar, pitch, and other bituminous or resinous substances—for the purpose either of increasing the heating powers of the mass or of causing the peat-earth to mold better and form a substance resembling mineral coal. All of these processes for producing artificial fuel are open to objection and possess certain disadvantages, which, however, it is not necessary to cite here. I have discovered by experiment that if the undecomposed fibers and rooty substances contained in the peat be removed from the black or slimy decomposed matter a great portion of the water will be removed with the undecomposed fibers and the black slimy decomposed peat may then be easily molded into any convenient form, and will when dry become a hard black or dark brown substance of about the density and specific gravity of mineral coal. Such substance may with advantage be used in place of coal, especially in the production of charcoal or in the manufacture of iron, for which it will be found particularly applicable. As the molded substance consists almost entirely of decomposed vegetable matter, it may easily be converted into charcoal, and in that form may be employed for any of the purposes for which charcoal is usually employed. The separation of the black slimy part of the peat from the undecomposed fibers may be effected in various ways.

The method which forms the subject of the present invention consists in squeezing out the decomposed matter from the undecomposed fibers by placing the mass of peat in a vessel, chamber, or receptacle provided with perforated sides and by applying pressure to the mass, causing the decomposed part to ooze or pass out of the holes, leaving the undecomposed fibers behind. In order to separate the decomposed vegetable matter from undecomposed fibers by this method I take peat fresh from the bog and place it in the hopper of a vessel of convenient size and provided with a stirring-stool, whereby it is forced forward in a conical-shaped vessel or chamber provided with perforated sides and, if considered necessary, with a perforated bottom. The sides and bottom of this conical-shaped vessel or chamber, which may be called the "straining" chamber or vessel, may be constructed either of perforated metal or of wire-gauze or other open-work which will admit of the substance being squeezed out through the perforations or small openings, while the fibrous portions are retained or passed through a larger opening conveniently provided for that purpose at or near the center of the vessel. In order to force the material or peat through the strainer a vertical stirrer provided with horizontal inclined arms, like the stirrer of a pug-mill, or a screw with a conical thread, is mounted in the strainer and is actuated by means of suitable gearing, so as to force the mass gradually downward in the straining or separating vessel.

In the accompanying drawings I have shown various views of an arrangement of apparatus that may be used for the purpose of my invention; but I do not mean or intend to confine myself thereto.

Figure 1 is a sectional elevation showing the principal working parts. Fig. 2 is a front elevation of the same.

The rough peat from the bog is thrown into a hopper $a$, from whence it is carried down into the conical straining-vessel $b\,b$ by the rotation of the conical screw $c$ at the lower end of the vertical shaft $d$, to which a continuous and regular motion is communicated by means of bevel-toothed or other gearing $e\,e$ at the upper end of the shaft. The conical straining-vessel $b$ may, if desired, be inclosed within a hot-air chamber, which may be heated by the fire of a furnace conveniently arranged for the purpose. The screw $c$ by its rotation will force the pasty and decomposed parts of the peat through the perforated sides of the conical chamber $b$, and the separated portions thus forced through the perforations will fall down in the form of worm-like pieces, like broken vermicelli or macaroni, and by being delivered onto the inclined plate $f\,f$, which may, if desired, be heated, or into a hot-air chamber in this finely-divided state, will quickly part with a portion of its moisture, which will be carried off up the chimney. The worm-like mass will fall from the perforated conical strainer $b$ onto the inclined plate $f\,f$ and be deposited ultimately on a traveling belt, which will convey it away. The mass of expressed peat may then be molded and cut up into convenient lengths for the subsequent drying and hardening process.

From the above description it will be understood that the peat or material to be operated upon is merely placed in the hopper in its natural state as it comes from the bog, and it is worked and pressed by the screw or stirrer $c$ until the black pasty decomposed portions of the peat are squeezed out through the strainer and separated or removed from the undecomposed fibers, which are retained or kept back in the strainer or receptacle, while the other parts are made to ooze out of the perforations or openings in the sides of the conical straining-receptacle. An opening is made at the central part of the conical strainer at the bottom, and the undecomposed fibers are by the rotation of the screw $c$ forced out of this opening and conveyed by a pipe or channel $m$ into a separate vessel or chamber provided for the purpose.

The separating process may therefore be continued without interruption, the attendants only being required to supply the hopper of the straining-chamber regularly with fresh peat and to mold peat and cut it into convenient lengths. Sometimes the thick pasty mass which thus oozes out through the perforations of the strainer or receptacle will be found to have such a consistence as to admit of the mass being molded at once into any required form without having recourse to any artificial drying operation; but I usually find it convenient and advantageous to deliver the expressed material either in a hot-air chamber, as already described, and in passing through which a portion of the aqueous particles will be driven off from the material, as before mentioned, or it may be delivered onto a hot plate, which by heating the divided peat will have the same effect. As the decomposed and strained portion of the peat issues from the perforations of the conical strainer in a divided state resembling thin worms, the facility with which it may be dried will be apparent. Care must be taken that the partial drying or heating operation should be carried on only for such a length of time and in such a manner as will be sufficient to bring the material to the proper consistence for molding. Moreover, the preparatory drying operation must not be carried to such an extent as would prevent the substance from being molded with facility. When therefore the substance has been molded into the blocks or articles of the required size and form, these articles should be removed into a drying-chamber, where they must be perfectly but gradually dried until they become quite hard, taking care, however, that they be not exposed to a temperature which will cause them to crack, as would be the case if they were dried too quickly.

Having now described my invention of improvements in the preparation of peat and explained the manner of carrying the same into effect, what I claim as new, and desire to secure by Letters Patent, is—

Separating the decomposed from the fibrous or undecomposed portions of the peat by straining or keeping back the latter while the decomposed portions of the peat are forced through the perforated sides of the straining vessel or receptacle, substantially in the manner and for the purpose herein specified.

In witness whereof I, the said WILLIAM HENRY BUCKLAND, have hereunto set my hand and seal this 27th day of September, A. D. 1861.

W. H. BUCKLAND. [L. S.]

Witnesses:
  FRED WALKER, Sr.,
  C. WINTERSGILL.